Jan. 20, 1925.  
V. L. CHAMBERLIN  
DETECTOR ROD SUPPORT  
Filed Feb. 1, 1924  
1,523,399

INVENTOR.  
VERN L. CHAMBERLIN  
BY  
ATTORNEY.

Patented Jan. 20, 1925.

1,523,399

UNITED STATES PATENT OFFICE.

VERN L. CHAMBERLIN, OF PONTIAC, MICHIGAN.

DETECTOR-ROD SUPPORT.

Application filed February 1, 1924. Serial No. 689,968.

*To all whom it may concern:*

Be it known that I, VERN L. CHAMBERLIN, a citizen of the United States, residing at Pontiac, county of Oakland, State of Michigan, have invented a certain new and useful Improvement in Detector-Rod Supports, and declare the following to be a full, clear, and exact description of the same, such as will enable others skilled in the art to which it pertains to make and use the same, reference being had to the accompanying drawings, which form a part of this specification.

This invention relates to detector rod supports for crystal detectors and the object of the invention is to provide a detector rod support which allows rotation of the rod as well as movement thereof in any direction so that the detector wire carried by the rod may be applied to any point on the crystal. Another object of the invention is to provide a detector rod support by which the rod may be set in any desired position, means being provided for holding the rod in the position set. Another object of the invention is to provide a detector rod support which is adapted for use with the usual types of crystal detectors and in which the detector rod is capable of practically universal movement. Another object of the invention is to provide a double ball joint comprising a stationary ball on which a tube is movable in any direction and a movable ball in the opposite end of the tube which may be turned in any direction in the tube, the detector rod being rotatably mounted in the ball and movable longitudinally therethrough and a spring being adapted to hold the parts in assembled relation with sufficient tension to prevent accidental movement of the parts. These objects and the several novel features of the invention are hereinafter more fully described and claimed and the preferred form of construction by which these objects are attained is shown in the accompanying drawings in which—

Figure 1:
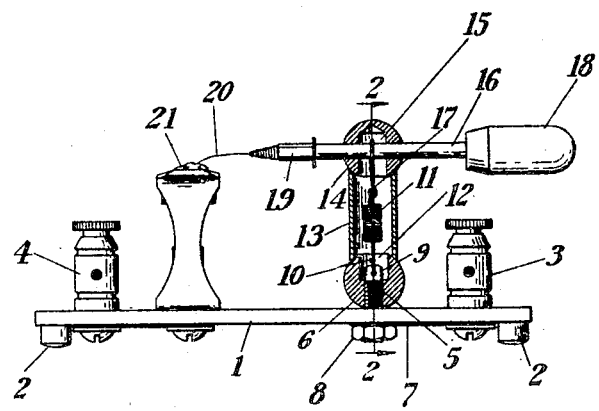
Fig. 1 is an elevation of a crystal detector showing the detector rod support in section.
Figure 2:
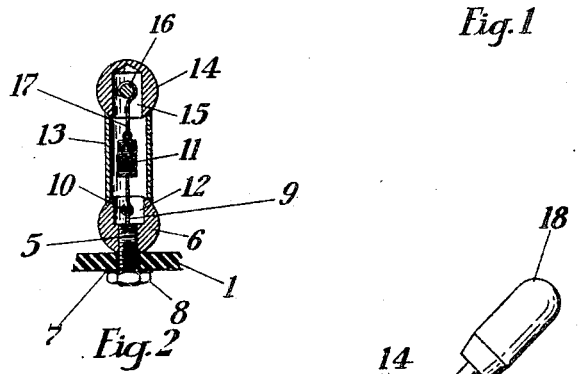
Fig. 2 is a section taken on line 2—2 of Fig. 1.
Figure 3:
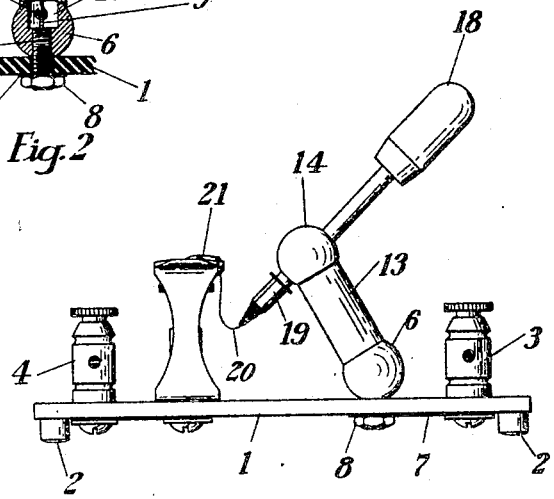
Fig. 3 is an elevation illustrative of the extent to which the detector rod may be moved.

As shown in Fig. 1 a base 1 is provided of insulating material and supporting feet 2 are secured to the base 1 as shown. Binding posts 3 and 4 are secured to the base 1 and a threaded rod 5 extends through the base 1 and is threaded into a ball 6 as shown in Fig. 1. This threaded rod 5 extends downwardly through the base 1 and through a brass strip 7 secured to the binding post 3 and a nut 8 is threaded onto the end of the rod 5 thus securing the ball 6 rigidly in position. The upper end 9 of the rod 5 is flattened as shown more particularly in Fig. 2 and the end 10 of a coiled spring 11 is hooked through an aperture provided therefor in the end 9 of the rod 5. The rod 5 is adjusted so that the aperture in the end 9 thereof is positioned at about the center of the ball 6 so that the tension of the spring 11 is not varied during movement of the tube 13 over the ball 6. The ball 6 is provided with a recess 12 so that the tube 13 which fits the face of the ball 6 may be moved thereover without the end 10 of the spring engaging the edge of the ball. A ball 14 is supported in the upper end of the tube 13 and may be moved about in the end of the tube and the ball 14 is provided with a recess 15 open to the interior of the tube 13. The detector rod 16 extends through the ball 14 and recess 15 and a hook 17 is secured to the coiled spring 11 and engages over the detector rod 16 the spring being under tension at this time to cause frictional engagement between the parts and thus prevent accidental movement of the detector rod. The detector rod 16 is provided with a knob 18 at one end and a detector tip 19 fits over the opposite end of the rod 16 and carries a fine detector wire or cat whisker 20. This detector wire 20 is adapted to be moved over a crystal 21 until a sensitive point is found on the crystal and the device is left in position as long as the crystal point remains sensitive which lasts for a period of three or four days. This detector rod support may be used with any suitable type of crystal holder and preferably one in which several sides of the crystal are exposed. By means of the hook 17 and spring 11 rotation of the rod 16 on its longitudinal axis and longitudinal movement thereof is frictionally resisted so that the rod 16 may be turned or moved longitudinally and will remain in the position to which it is turned. Also by means of the spring 11 the ball 14 is held in frictional engagement with its seat in the end of the tube 13 and the lower end of the tube 13 is held in frictional engagement with the stationary ball 6. By this construction the rod 16 may be rotated on its longitudinal axis may be moved longitudinally and may be turned in any direction on the ball 14 as a pivot and may also be turned on the ball 6 as a pivot as will be understood from Fig. 3, the frictional engagement of the parts by the spring 11 holding the device in any position set. The tension of the spring 11 may be increased by unthreading the rod 5 from the ball 6 and then turning up the nut 8 to tightly secure the ball 6 to the base, and in a like manner the tension of the spring 11 may be decreased by threading the rod 5 further into the ball 6 thus moving the hook end 10 toward the hook end 17. By this construction the detector wire 20 may be applied to all sides of the crystal 21 without removing the crystal from the holder. The valuable feature of this invention is the fact that the detector rod and support will remain in any position set so that when the sensitive point on the crystal is found the detector wire will remain in contact with this point until it is intentionally moved. One of the disagreeable features of a great many supports of this nature is the tendency for the support to spring back slightly when released by the operator so that the point on the crystal is lost and must again be found, but this is entirely eliminated in the support shown and when a sensitive point is found the detector wire will remain in contact therewith as long as the point remains sensitive which is usually for a period of three or four days at a time after which the detector rod may be moved to find another sensitive point.

From the foregoing description it becomes evident that the device is very simple and efficient in operation, is composed of few parts and is of consequent low manufacturing cost, will not easily get out of order and will remain in the position set and provides a device which accomplishes the objects described.

Having thus fully described my invention, its utility and mode of operation, what I claim and desire to secure by Letters Patent of the United States is—

1. A detector rod support for crystal detectors comprising a base, a threaded rod extending through the base, a stationary ball threaded onto the said rod, the ball being provided with a recess into which the end of the said rod extends, a tube open to the recess and provided with an end seating on the stationary ball and movable thereover, a movable ball seating in the upper end of the tube and provided with a recess open to the tube, a detector rod rotatably mounted in the movable ball and extending through the recess, and a coiled spring having one end engaging about the detector rod in the recess of the movable ball, the opposite end of the spring being secured to the end of the threaded rod in the recess of the stationary ball.

2. A detector rod support for crystal detectors comprising a base, a stationary ball secured to the base, a tube provided with an end seating on the stationary ball and movable thereover, a movable ball seating in the upper end of the tube and provided with a recess, a detector rod rotatably mounted in the movable ball and extending through the recess, a coiled spring having one end engaging about the detector rod in the recess of the movable ball, the opposite end of the spring being secured in the stationary ball, and means for adjusting the tension of the spring.

3. A detector rod support for crystal detectors comprising a base, a stationary ball secured to the base, a tube provided with an end seating on the stationary ball and movable thereover, a movable ball seating in the upper end of the tube and provided with a recess, a detector rod rotatably mounted in the movable ball and extending through the recess, the recess being open to the interior of the tube, a coiled spring having a hook end engaging over the detector rod within the recess, the opposite end of the spring being secured in the stationary ball, and a detector wire carried by the end of the detector rod.

4. A detector rod support for crystal detectors comprising a base, a ball stationarily mounted on the base, a tube provided with an end seating on the ball, a ball seated in the upper end of the tube and movable therein, a detector rod extending through the movable ball, a spring having one end engaging about the detector rod in the movable ball, the opposite end of the spring being secured in the stationary ball, and a detector wire carried by the detector rod.

5. A detector rod support for crystal detectors comprising a base, a stationary ball secured to the base, a member seating on the stationary ball and movable thereover, and a detector rod pivotally mounted in the upper end of the said member and rotatable therein.

6. A detector rod support for crystal detectors comprising a base, a ball stationarily mounted on the base, a member seating on the said ball and movable thereover, a second member pivotally mounted in the first named member, and a detector rod movable longitudinally through the said second member and rotatable therein.

In testimony whereof, I sign this specification.

VERN L. CHAMBERLIN.